March 8, 1932. C. H. BROWN 1,848,933
GRADING MACHINERY
Filed Feb. 24, 1931 2 Sheets-Sheet 1

INVENTOR
Charles H. Brown,
BY
ATTORNEY

March 8, 1932.  C. H. BROWN  1,848,933
GRADING MACHINERY
Filed Feb. 24, 1931   2 Sheets-Sheet 2
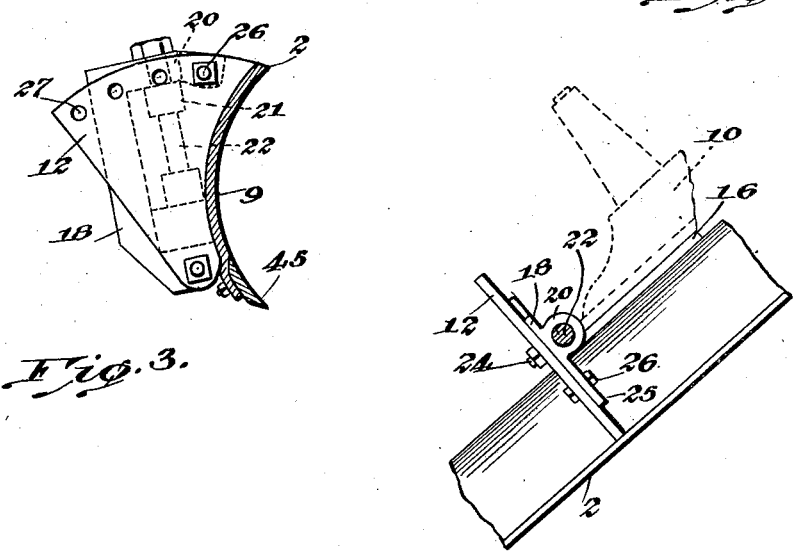
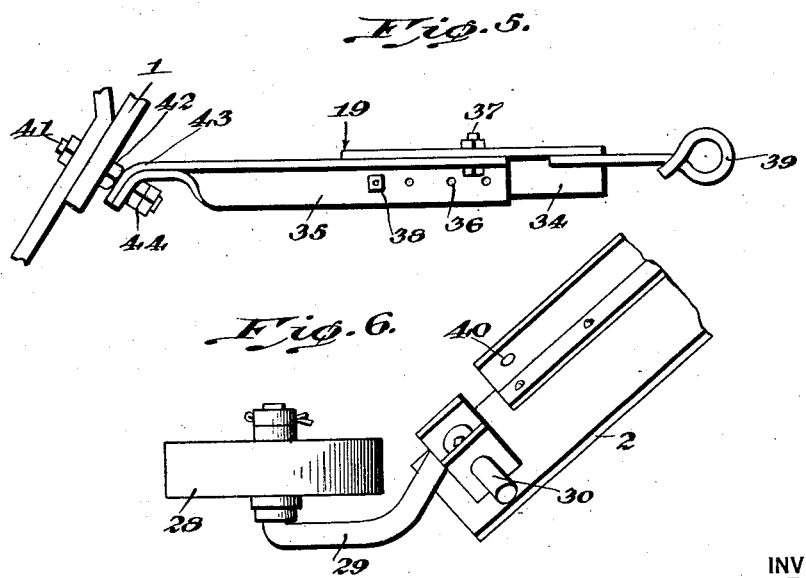
INVENTOR
Charles H. Brown,
BY
ATTORNEY Patented Mar. 8, 1932

1,848,933

UNITED STATES PATENT OFFICE

CHARLES H. BROWN, OF BRECKENRIDGE, TEXAS

GRADING MACHINERY

Application filed February 24, 1931. Serial No. 517,916.

This invention relates to an improvement in grading machinery and has for its object to provide a device of this character wherein a grading blade of suitable design and with suitable means for attachment to plows, for ordinary grading and ditching operations and is especially valuable in farm operations since by fitting the attachment to plows already owned by the farmer an efficient grading machine is available that equals in performance machines costing much more.

The rapid erosion of farm lands whereby the fertility of all sloping land is being rapidly depleted has already rendered much of the land worthless for tillage and this destruction of farm lands amounts to a public emergency.

A primary object of this invention is to provide suitable and efficient means for preventing the washing away of the best part of the lands and reclaiming badly washed lands.

The establishment of the facts that terracing of farm lands is the only preventive for erosion and cure for the already thrown-out fields, also that by terracing the land farmers are enabled to farm their crops with contoured rows, that the moisture obtained in the winter is conserved in the soil and the water from rains in the summer is held on the fields where it fell and thereby good crops are grown even in years of severe drouth whereas on adjacent fields of even fertility, not terraced and the rows not contoured, very light crops and in many instances no crops at all are grown to maturity, make it of extreme importance that the most economical means both from point of first cost and of operation be made available for the use of farmers at as early a date as is possible. What has been said regarding the conserving of moisture for farm lands applies also to pasture lands and when the grass is grazed short in dry years, the erosion is almost as severe on pasture lands, later, when the heavy rains come, as for farm lands.

It has long been established that plows of the disc type would work in dry, hard soil better than any other plow but they were impractical for building terraces owing to the fact that the ground, being plowed up and thoroughly pulverized in the first time over, was so fine that the discs could make little progress in throwing the dirt sidewise up a dump on subsequent rounds and that for moving dirt up a dump the moldboard type of grader was superior. It is also well known that although it is of advantage to have the dirt plowed up for grading with a moldboard type of grader, it is also advisable for the forward point of the cutting edge to cut low enough to pick up some unplowed firmly packed dirt for by this method the entire volume can be rolled over and over and delivered up the dump with less forward travel and it is one object of this invention to provide a machine that uses one or more discs for most of the plowing part of the operation and a moldboard to give most of the side movement of the dirt.

Another object is to provide a blade or grading attachment for plows than can be adjusted so the blade may be set at various horizontal angles by means of an adjustable brace on its back side and a hinged attachment at the point of attachment to the plow frame so that it will handle all types and conditions of soil.

A further object is an attachment on the back side of the blade allowing a rotating motion which allows the outer end of the blade to rise and fall as the contour of the ground or height of the grade requires.

Another object is to provide a blade for attachment to a plow which only replaces a portion of the plowing discs and leaves the remainder of this efficient equipment for loosening the dirt and moving it part of the necessary distance, the grading blade picking the dirt up at that point and shoving it farther up the dump on the next round.

A still further object is to provide a grading attachment for disc plows wherein the advantages of the disc plow is retained in plowing hard land and a grader blade is used to move the plowed dirt up the dump.

Another object is to provide a machine having the combination of the disc plow and grader blade and doing the work of both in one operation.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 shows a part sectional and end view of the blade when cut on the line 3—3 of Figure 2.

Figure 4 shows further detail of hinge and method of bolting to the disc hub.

Figure 5 shows detail of one form of adjustable brace used to support the outer end of the blade.

Figure 6 shows method of attaching crazy wheel to outer end of the blade and means for the vertical adjustment of the crazy wheel.

Figure 1:
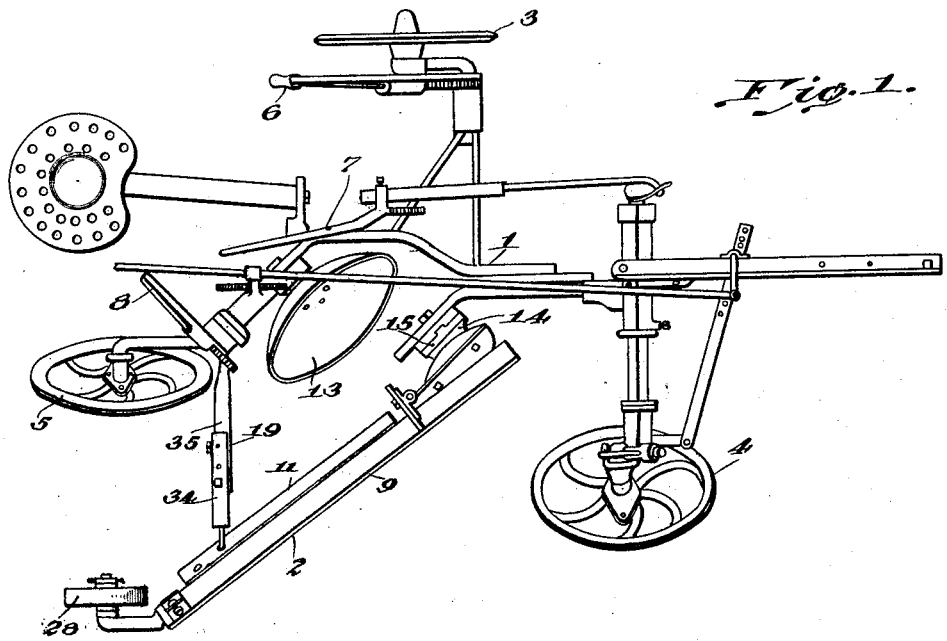
Figure 1 is a plan view showing a two-disc plow of ordinary construction with the grading blade attached.

Referring now to the drawings in detail, I have shown a wheeled disc plow 1 of conventional design and of the general type illustrated in the patent to Waterman, No. 705,627, July 29, 1902, with my improved grader 2 attached thereto.

The frame of the plow is adjustably supported by the usual ground wheel 3, furrow wheel 4 and caster wheel 5, the frame being independently vertically adjustable at each wheel through the medium of hand levers 6, 7, and 8 respectively and associated crank axle structure as commonly employed for this purpose.

The grader 2 includes an elongated transversely curved grader blade 9, which is set obliquely to the line of draft of the plow 1 and is attached to one of the disc hubs 10 thereof in a manner to be presently explained. The grader blade 9 is stiffened by means of a suitable angle bar 11 which extends longitudinally and is rigidly secured to the rear face thereof, and a segmentally shaped brace plate 12 which extends at right angles to said rear face.

In Figure 1 the blade 9 is shown attached to the forward disc shank or hub 10 from which a disc similar to the plowing disc 13, has been removed but the disc hub 10, bearing 14, and vertical adjusting device 15 for the disc hub common to such plows have been left in place. The hub 10, alone, is also indicated by dotted lines in Figures 2 and 4. An attaching plate 16 is bolted as at 17 to the hub 10 and carries a hinge plate 18 to which the segmental brace plate 12 is secured. This arrangement allows for a universal movement of the outer end of blade 9 with relation to the frame of the plow 1 except as limited by an adjustable brace 19 extending between the outer end of the grader blade 9 and the frame of the plow.

Vertical adjustment of the forward end of the blade 9 with relation to the plow frame is provided through the use of the original vertically sliding block 15 as regularly used on disk plows.

Figure 2:
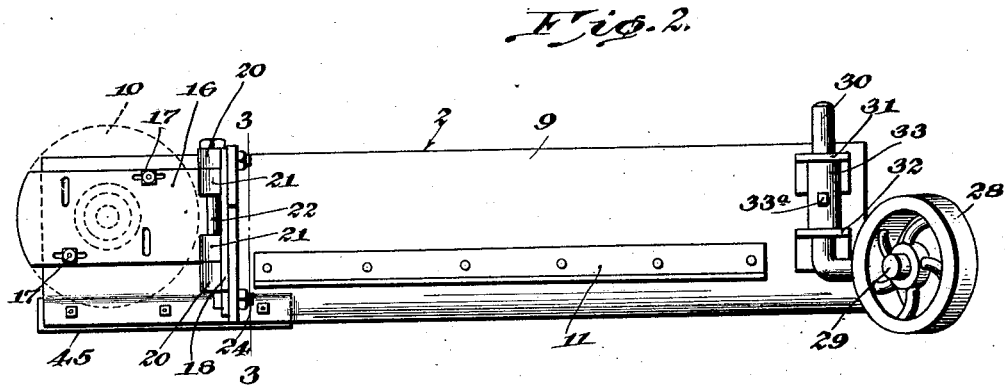
Figure 2 shows a rear view of the grading blade as removed from the plow but with the disc hub indicated by dotted lines showing how the blade is bolted to the hub thereby retaining the facility for a vertical movement of the outer end of the blade.
Figure 7:
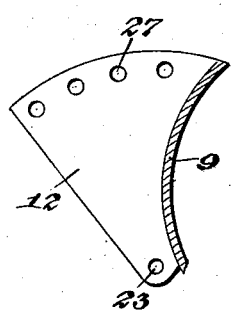
Figure 7 shows the segmentally shaped brace by which the blade is attached to the plow.

As will be seen more clearly in Figs. 2, 3 and 4, the hinge plate 18 has two spaced hinge ears 20 at one side which register with corresponding ears 21 on the attaching plate 16. A hinge pintle 22 extending through said ears completes the hinge which allows the outer end of the blade to swing horizontally backward for angular adjustment. The segmental brace plate 12 has an opening 23 formed at its lower end for the reception of a pivot bolt 24 which extends through the lower end of the hinge plate 18 and through said opening whereby to permit pivotal adjustment of said brace plate and the grader blade about said bolt 24. The hinge plate 18 is also formed with a forwardly projecting portion 25 at the top thereof which has an opening therethrough for the reception of a bolt 26 which bolt passes through one of a series of spaced openings 27 in the upper part of the segment 12 to secure the grader blade in adjusted position. By engaging the bolt 26 through a selected one of the openings 27, suitable vertical angular adjustment of the forward surface of the blade 9 about the pivot 24 is accomplished.

A crazy wheel arrangement for adjustably supporting the outer or rearward end of the blade 9 is shown in Figs. 1, 2 and 6 and in its simplest form comprises a ground wheel 28 journalled on the angularly offset lower end 29 of a pivotally and vertically adjustable shank 30. This crazy wheel arrangement is mounted on the rear face of the blade 9 as shown by passing the shank 30 through alined openings in a pair of spaced lugs 31 and 32 and through an adjusting collar 33 held between said lugs as more clearly shown in Figs. 2 and 6. The shank 30 is adjustable in a general vertical direction within the sleeve 33, which is designed to take thrust both up and down and which is provided with a set screw 33a for locking the shank in adjusted position. By adjusting the shank 30 up or down, the delivery end of the blade 9 may be raised or lowered so that the dirt may be properly gathered and distributed thereby.

The adjustable brace 19 for supporting and bracing the outer end of the grader blade 9 from the plow frame, as shown in Figs. 1 and 5 preferably comprises two members slidably connected to each other which are shown consisting of two angle sections 34 and 35 with a series of holes 36 therein for making linear adjustment by means of the bolts 37 and 38. This brace may be connected to the outer end of the blade by passing an open hook 39 carried by the angle member 34 thru a hole 40 in the horizontal flange of the angle 11 and connected by suitable means to the rear end of the plow frame as shown in Figure 1, a detail of such a suitable fastening being shown as attached to part 35 in Figure 5 and in operation consists in removing a bolt from the rear end of the plow frame and replacing it with a double ended bolt 41 having a middle shoulder 42 as shown whereby the part 35 is bolted thru its curved end 43 to the frame with enough slack left in screwing up the nuts 44 on the end of the bolt holding the brace so that enough universal movement is allowed the forward end of the brace to permit of rise and fall of the end of the blade as the crazy wheel follows the contour of the ground. The slidable adjustment of the parts 34 and 35 together with the hinge mounting of the blade enables the operator to change the angularity of the blade with reference to the line of travel and with the available vertical adjustment of each end of the blade independently and of the top of the blade forward or backward as the kind of or condition of the soil demands, very efficient operation can be effected.

A short double edged, reversible cutter blade 45 is shown in Figures 2, 3 and 4 as attached to the large grader blade 9. This cutter blade 45 which takes the wear in plowing the small amount of dirt necessary to enable the grader blade to scour properly extends for only about one-fourth of the length of the blade 9 as practically all of the wear comes at that point and is renewable, when worn, at small expense.

It will be noticed that in the arrangement shown that while the disc is plowing the blade does little work the first round but afterward the blade picks up the dirt of the previous round and carries it onto the dump. It is also to be observed that the blade can be mounted to the rear of the plowing discs where it would pick up and carry the dirt for the same round but a much longer blade would be necessary and difficulty would be found in properly supporting the rear end of the blade which must be capable of standing very severe service and unless it was projected from the hub on a long stem like support the forward point of the blade would be doing most of the plowing while the discs would be of little service.

The forward edge of the grader blade 9 is preferably adjusted through the medium of the vertically sliding block 15 and the adjustments at the wheels 3, 4 and 5 so that the cutter blade 45 will be set slightly lower than the plowing disk 13. When this is done, the blade will turn up a small amount of new ground in addition to that turned by the disk and the device will operate much more efficiently due to the fact that the blade is thus enabled to get under the entire mound turned up by the disk on the previous round.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:—

1. In a grading machine, in combination, a supporting frame adjustably supported by wheels having independent vertical adjustments, said frame carrying a disc cutter suitably mounted for plowing operations and capable of adjustment in and out of the ground by means of the wheels on the frame, a grader blade suitably connected at its forward end to the forward part of the frame by means of a combined horizontally hinged and vertically rotating attachment, said blade having a rearward adjustable brace to hold it approximately at any fixed horizontal angle but allowing vertical motion of the outer end of the blade, and a crazy wheel on the outer end of the blade having vertical adjustment.

2. In a grading attachment for disc plows comprising a grader blade with suitable means for attachment to the plow by replacing one of the discs of the plow, the grader blade being bolted to the rotatable hub thereof, said grader blade being supported rearwardly at its outer end by a suitable brace extending to the frame of the plow, said brace permitting of vertical movement of the outer end of the blade, and a crazy wheel having vertical adjustment attached near the outer or rearward end and back side of the blade.

3. In a grading attachment for disc plows comprising a transversely curved grader blade mounted for tilting movement with its concave face forward, said grader blade having a short reversible cutter blade on its lower edge at its forward end, a combined hinged and rotating attachment for fastening the grader blade to the plow frame, a crazy wheel carrying the outward and rearward end of the grader blade, and an adjustable brace suitably attached to and regulating the backward angularity of said blade.

4. In combination with a wheeled plow frame, a rotatable hub member carried thereby, an attaching plate secured to said hub, a grader blade hingedly secured to said attaching plate adjacent its forward end, a carrying wheel for the rearward end of said grader blade having means for vertically adjusting the height thereof, and an adjustable brace extending between the rearward end of said grader blade and said plow frame.

5. In combination with a wheeled plow frame, a rotatable hub member carried thereby, an attaching plate rigidly secured to said hub, a hinge plate hingedly secured to said attaching plate, a grader blade adjustably secured to said hinge plate adjacent the forward end thereof, means for effecting vertical adjustment of said hub and thus the forward end of said grader blade, a ground engaging wheel for supporting the rearward end of said grader blade, and a brace extending between said rearward end and the frame of said plow.

6. In combination with a wheeled plow frame, a rotatable hub member carried thereby, a grader blade hingedly secured to said hub adjacent its forward end, and a brace extending between the rearward end of said grader blade and said plow frame.

7. In combination with a wheeled plow frame, a plurality of rotatable disk hubs mounted thereon, a plowing disk secured to one of said hubs, a grader blade hingedly secured to another of said hubs adjacent its forward end, and a brace extending between the rearward end of said grader blade and said plow frame.

8. The combination with a wheeled plow frame, a rotatable hub member carried thereby, a grader blade hingedly secured to said hub adjacent the forward end thereof, means for effecting vertical adjustment of said hub and thus the forward end of said grader blade relative to said frame, and a brace extending between the rearward end of said blade and the frame of said plow.

CHARLES H. BROWN.